Nov. 5, 1968   W. L. GRUBE   3,408,881
AUTOMATIC TWO-SPEED HAND BRAKE MECHANISM
Filed June 30, 1967   5 Sheets-Sheet 1
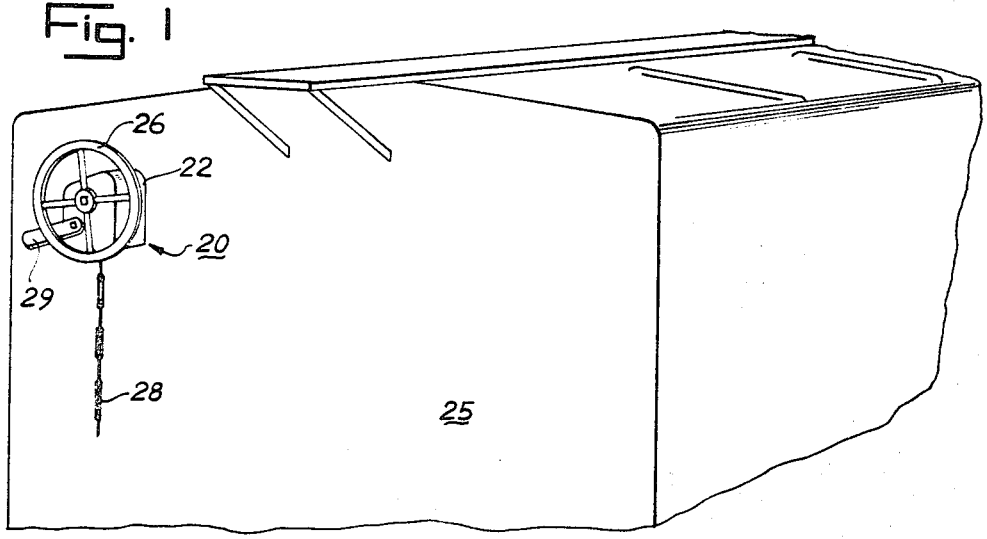
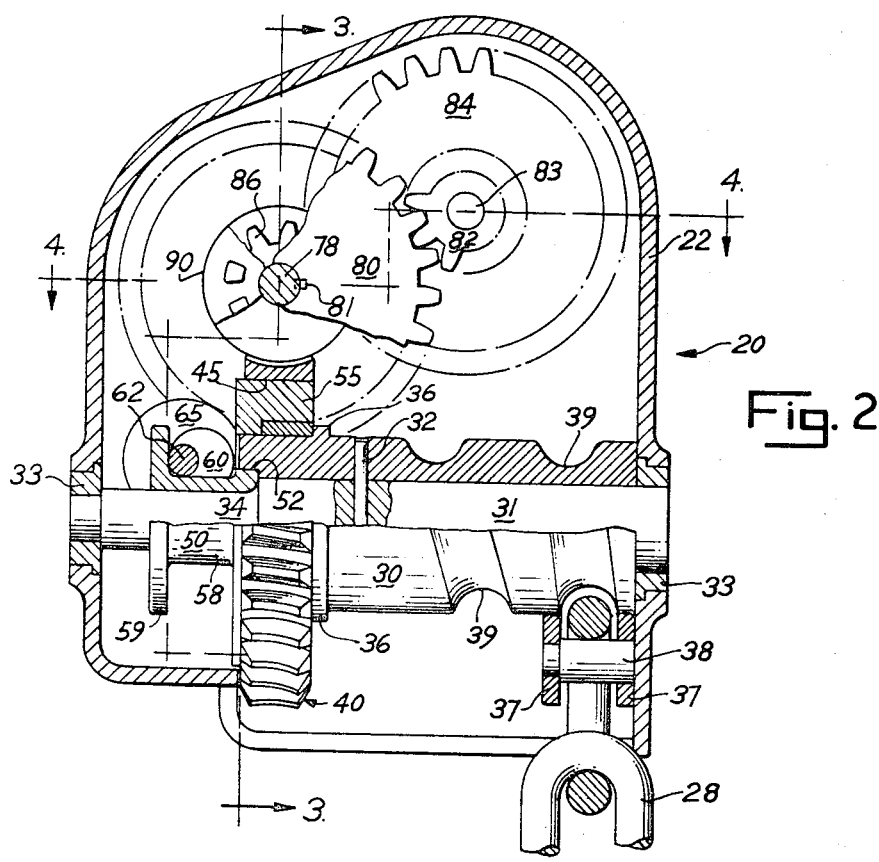
INVENTOR
WILLIAM L. GRUBE
BY
Horton, Davis, Brewer & Brugman
ATTORNEYS

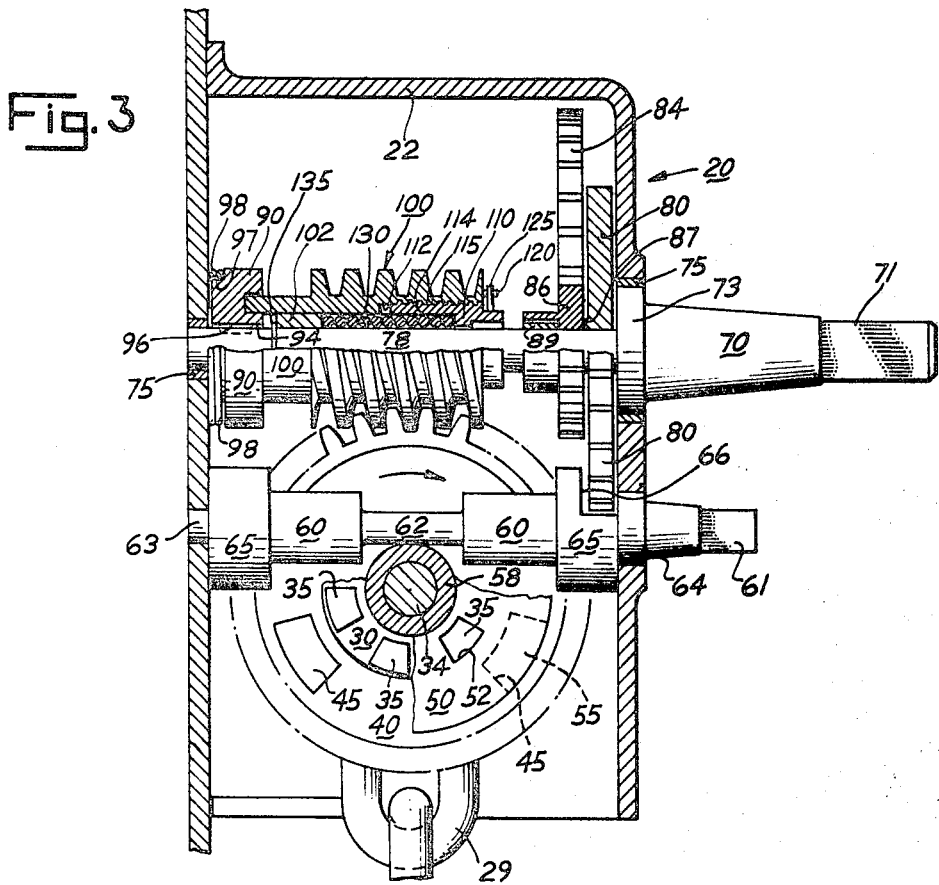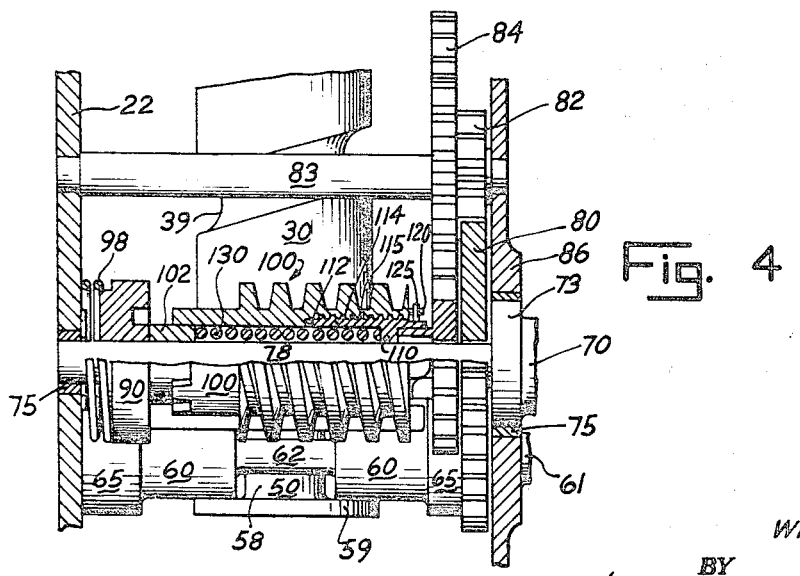

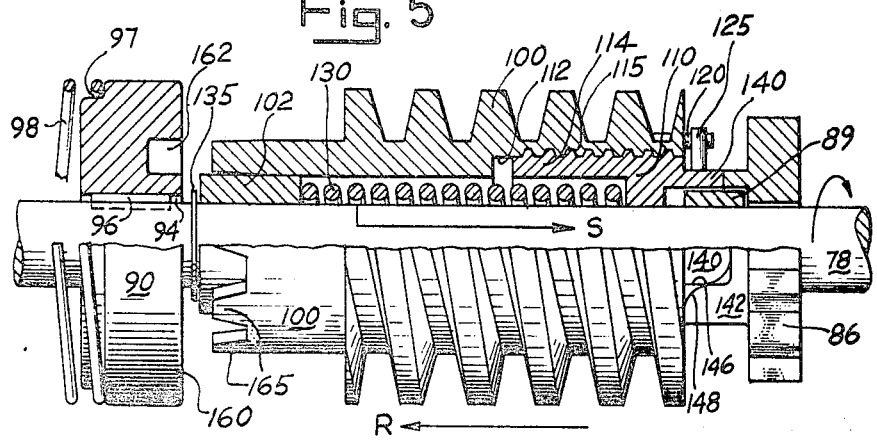
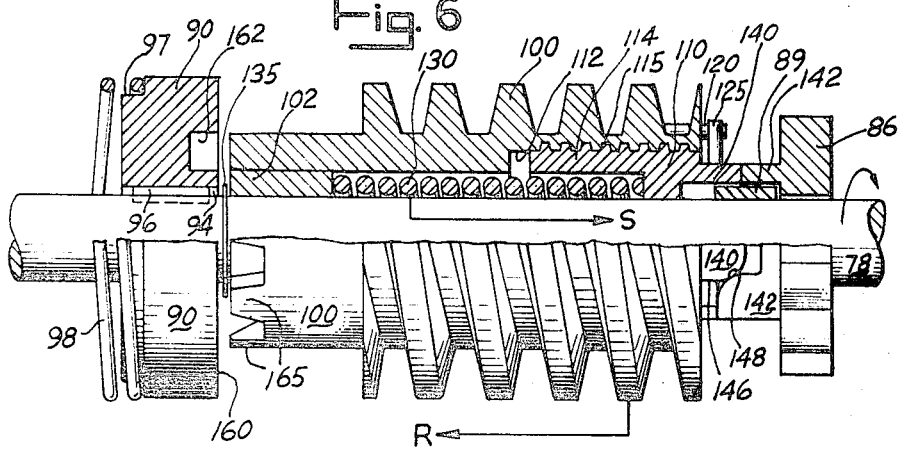
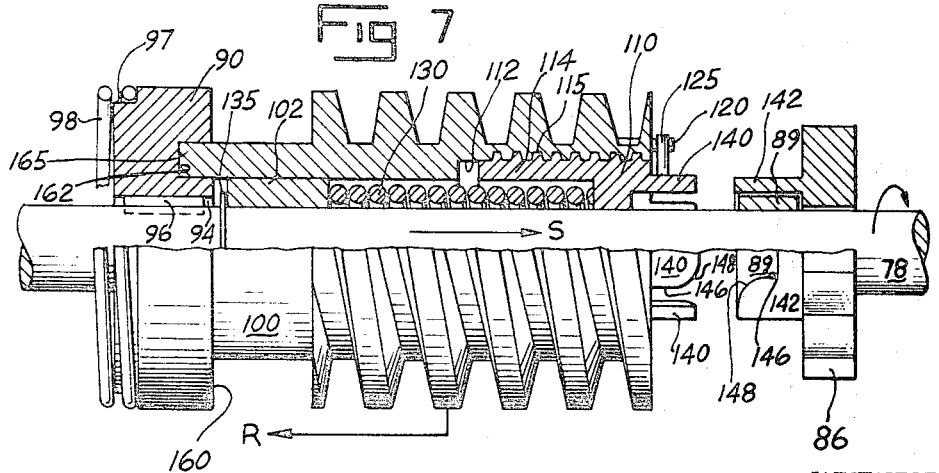

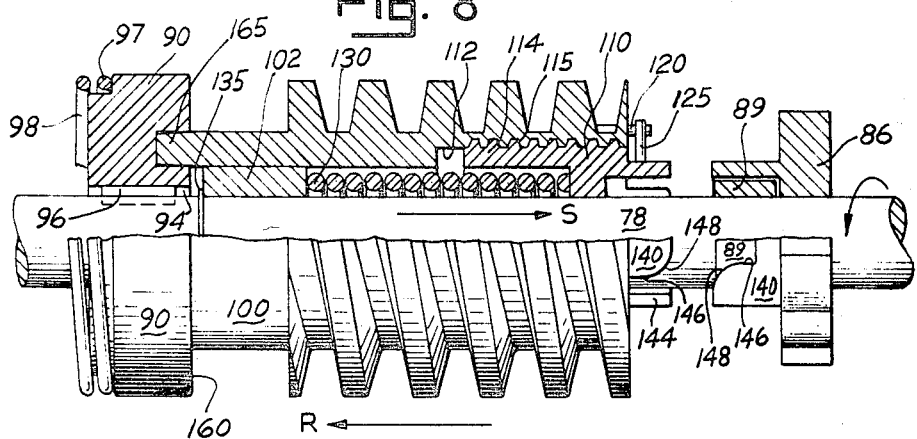
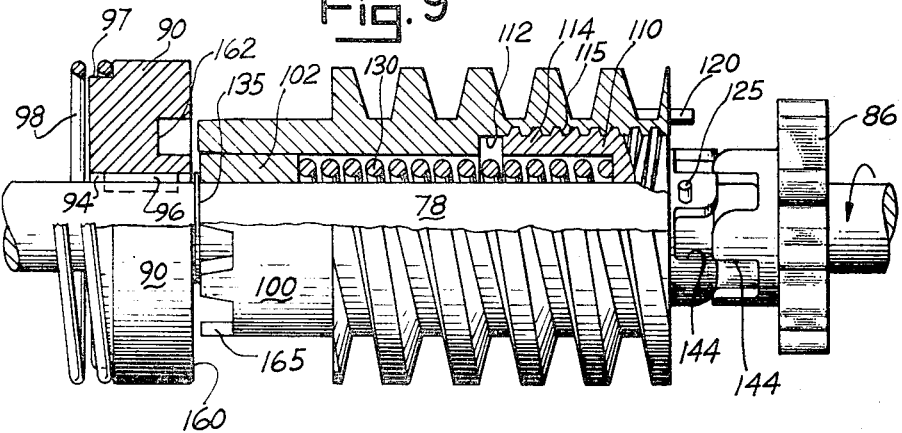
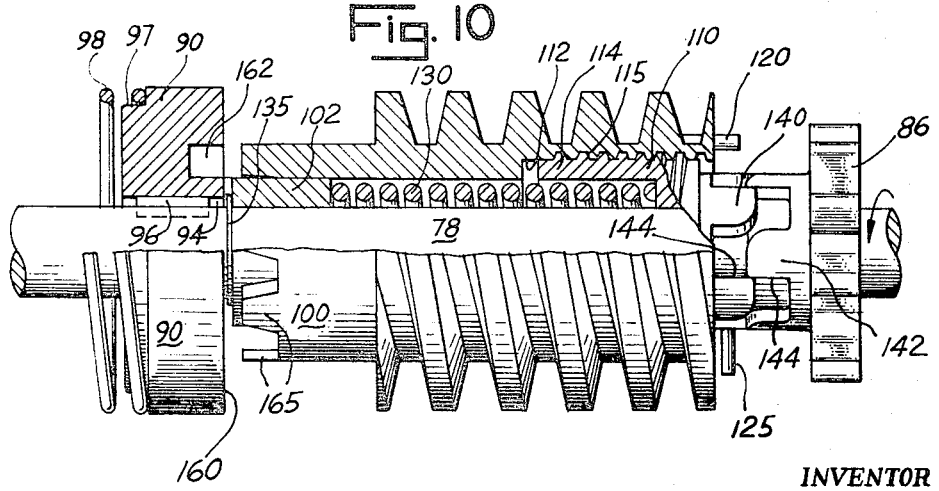

Nov. 5, 1968  W. L. GRUBE  3,408,881
AUTOMATIC TWO-SPEED HAND BRAKE MECHANISM
Filed June 30, 1967  5 Sheets-Sheet 5
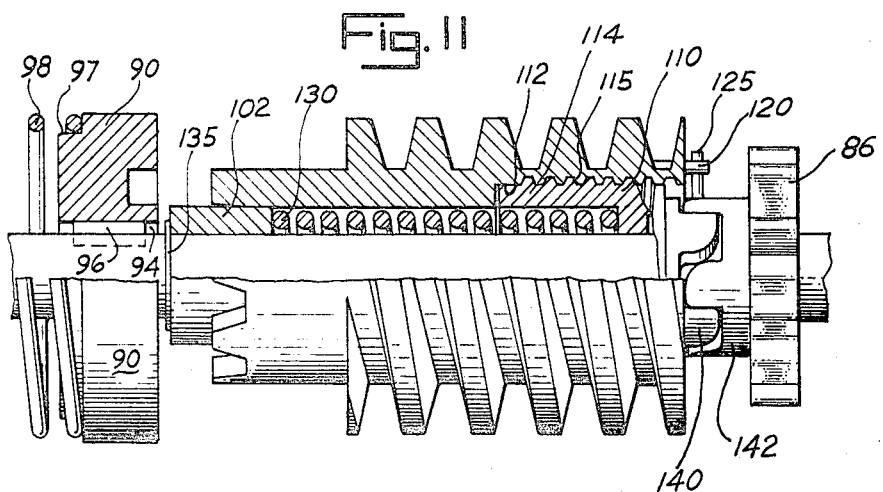
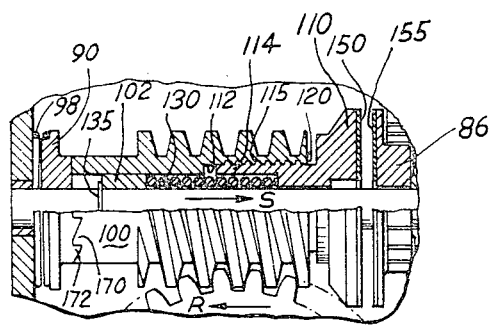
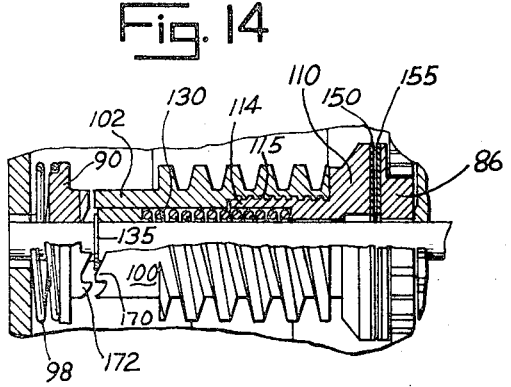
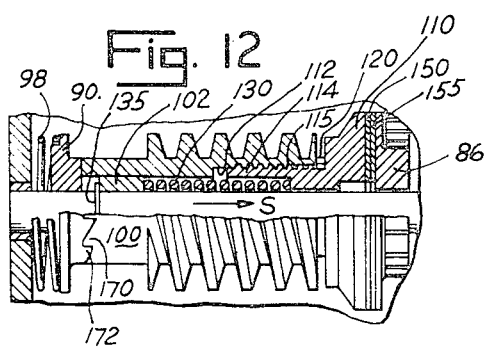
INVENTOR
WILLIAM L. GRUBE
BY
Horton, Davis, Brewer & Brugman
ATTORNEYS United States Patent Office 3,408,881
Patented Nov. 5, 1968

3,408,881
AUTOMATIC TWO-SPEED HAND BRAKE
MECHANISM
William L. Grube, Northbrook, Ill., assignor to MacLean-Fogg Lock Nut Co., Mundelein, Ill., a corporation of Delaware
Filed June 30, 1967, Ser. No. 651,104
23 Claims. (Cl. 74—505)

ABSTRACT OF THE DISCLOSURE

A hand brake mechanism for automatic speed interchange by a slidable drive worm having at opposite ends, alternatively, a high and a low speed drive engagement. The low speed end is toward the winding reaction of the worm gear. A compression spring urges the worm against the reaction toward the high speed drive to quickly wind slack. The reaction thereupon increases to overcome the spring and shift the worm to the low speed drive for additional mechanical advantage. The worm has a high speed coupling end that screws axially inward upon initial contact with the high speed drive in an unwinding direction for a smooth interchange by allowing a complete disengagement from the low speed drive. Friction clutch plates, interlocking lugs, teeth and dents, and ratchets, are utilized for the low and high speed couplings. The worm gear and winding member are keyed together by a dog which is removable for quick release.

Background of the invention

This invention relates generally to railroad hand brake mechanisms, and more particularly, to an automatic two-speed hand brake mechanism.

Freight car hand brakes are in common usage, mainly for the stopping and parking of individual cars while the principal air brake system is disconnected and inoperative. Generally, the hand brakes are applied by turning a hand wheel to wind chain for activation of a power multiplying brake linkage. Power multiplication by the linkage requires relatively large chain travel to produce a correspondingly small braking travel. It has also been found desirable to provide power multiplication to take up chain in the hand brake mechanism itself. However, because of the relatively large travel requirement, chain take-up power multiplication, such as a worm drive, requires an excessive number of turns of the hand wheel to apply the brake. This is particularly so whenever the hand brake mechanism has been backed off, say by a quick release mechanism, leaving the chain in a slack condition. Application of the brake is thus time-consuming, and when immediate braking is required, presents a dangerous situation. Modern freight cars are becoming massive, and the trend is toward even more extreme power multiplication in hand brakes. Furthermore, all hand brake mechanisms must meet rigid railroad specifications, be interchangeable, and have a standardized operation.

Summary of the invention

Therefore, to overcome the foregoing and other difficulties of the prior art, the general object of this invention is to provide a new and improved automatic two-speed hand brake. To this end, the present invention teaches a drive worm slidable into engagement at either end, alternatively, with a high and a low speed drive. The worm drives a worm gear for a rotary chain winding member such as a drum or sprocket. The high and low speed drives are operated by turning a conventional hand wheel keyed to a drive shaft. For convenience, economy, and consolidation of parts and space, the worm, and high and low speed drives are all journaled on the same aforesaid drive shaft. A compression spring urges the worm against the chain winding reaction of the worm gear toward the high speed drive to quickly wind slack chain. Thereupon the reaction increases to overcome the spring and slide the worm to the low speed drive for additional mechanical advantage.

The high speed end of the worm has an axial bore for reception of a high speed coupling sleeve. The bore and sleeve are correspondingly threaded to contract the high speed coupling axially inward by screwing into the worm upon initial contact with the high speed drive in an unwinding direction. This provides a smooth interchange by allowing a complete disengagement from the low speed drive. The high speed drive includes a speed multiplying gear train having an initial gear keyed to the shaft for rotation therewith and a final gear journaled on the shaft for rotation relative thereto. The low speed drive is a collet keyed for rotation with the drive shaft. Various types of coupling means, such as friction clutch plates, interlocking lugs, teeth and dents, and ratchets, are utilized for engagement between the worm and the low and high speed drives.

The worm gear and the rotary chain winding member are keyed together by a slidable dog which extends through both. A lever operated cam engages the dog, and may be turned to slide the dog out of engagement for quick release of chain.

Thus, one of the objects of this invention is to provide for high speed take-up of slack which thereupon automatically shifts to a low speed take-up for power multiplication.

It is an object of this invention to save time and promote safety in the application of a brake by eliminating excessive hand wheel turns in applying the brake.

Another object of this invention is to provide an automatic two-speed hand brake which is interchangeable and has a simple standardized operation.

It is still another object to provide a durable, rugged hand brake which is economical to produce by utilizing a minimum of conventional, currently available materials and parts which lend themselves to standard mass-production manufacturing techniques.

Yet anther object of this invention is to promote a smooth automatic interchange between speeds of a two-speed hand brake.

It is also an object of this invention to provide a smooth interchange in an unwinding direction by allowing a complete disengagement from the low speed drive before engagement with the high speed drive.

This invention is also concerned with the provision of a quick chain release.

Further and other objects, and a more complete understanding of the invention may be had by referring to the following description and claims, taken in conjunction with the accompanying drawings.

Description of the drawings

For the purpose of illustrating the invention, there is shown in the drawings a form which is presently preferred, it being understood, however, that this invention is not necessarily limited to the precise arrangements and instrumentalities that are shown.

FIG. 1 is a partial perspective of a freight car showing the invented hand brake thereon;

FIG. 2 is an enlarged front cross-section of the hand brake shown in FIG. 1;

FIG. 3 is a cross-section of FIG. 2 taken along line 3—3;

FIG. 4 is a partial cross-section of FIG. 2 taken along line 4—4;

FIGS. 5, 6 and 7 are enlarged and partially sectioned views of the invented worm drive schematically showing interchange in a chain winding direction from high to low speed;

FIGS. 8, 9, 10 and 11 are enlarged partial cross sections of the invented worm drive schematically showing the chain unwinding interchange from low to high speed drive;

FIGS. 12, 13 and 14 are partial cross sections of the invented worm drive utilizing an alternate form of coupling and showing in schematic form three drive positions.

Description of the preferred embodiment

Referring now to the drawings in detail, wherein like numerals indicate like elements, there is shown in FIG. 1, an illustration of the hand brake of the present invention designated generally at 20.

As shown generally, the hand brake 20 is provided for use on a typical freight car, such as box car 25, whenever the primary air brake system is disconnected and inoperative. It is understood, of course, that this invention is not necessarily limited in use to a particular type of railroad car, the box car 25 of FIG. 1 being merely illustrative. The mechanism of hand brake 20 is enclosed within a casing 22, which, in turn, is affixed at a suitably accessible position, such as that illustrated. As is typical in hand brakes, a hand wheel 26 is provided to take up chain 28 for brake application. Furthermore, a lever 29 is provided for quick release of the chain 28.

The cross sections of FIGS. 2 through 4 are now referred to for detail of the hand brake mechanism. A rotary chain-winding member is provided by a winch drum 30 having an axial bore therethrough for snug reception of an arbor 31. A cotter 32 (visible in FIG. 2) pins the drum 30 and arbor 31 together. The arbor 31 is journaled, as illustrated, in bushings 33 for rotation within the casing 22. A reduced diameter portion 34 of arbor 31 provides a short undercut space at one end of drum 30. Symmetrically spaced (see FIG. 3) drum projections 35 extend axially outward over the undercut space. A peripheral collar 36 is provided on drum 30 a measured distance inward from the ends of projections 35, as shown. Spaced connector lugs 37 are welded or integrally cast on the drum 30 and extend radially outward. An end link of chain 28 is received between the lugs 37, as shown in FIG. 2, for reception of connecting rod 38 through openings in lugs 37 and through the chain link. In this manner, chain 28 is secured for winding on drum 30. The drum is grooved at 39 to provide guides for helical winding of the chain 28 thereon. It is to be understood that the chain drum 30 described is only one of many choices. That is, a winding member may be provided for by other types of winding drums or by a chain winding sprocket.

A worm gear 40 is provided for the drum 30. As disclosed by the cross section of FIG. 2, worm gear 40 is journaled on one end of drum 30 and abuts against the collar 36. The worm gear 40 has symmetrical (see FIG. 3) openings therethrough at 45.

The drum 30 and worm gear 40 are keyed for rotation together by a sliding dog 50. The dog 50 has a series of openings 52 correspondingly spaced for reception of drum projections 35. Outer lugs 55 project from dog 50 inwardly into symmetrical openings 45 of worm gear 40, as shown best in FIG. 2. Thus, dog 50 engages both the drum 30 and worm gear 40, keying all for rotation together. The dog 50 includes an axial collar 58 extending outward from drum 30 and gear 40 to terminate at a flanged end 59.

Circular cams 60 are provided on an eccentric (see FIG. 2) axle 62, which has an end 63 and enlarged diameter band 64 journaled in casing 22, as shown in FIG. 3. The remaining end 61 of the axle 62 is somewhat enlarged, having a cross-sectional shape, which may be square, hexagonal, etc. for reception in a matching wrench opening provided in the lever 29. In this manner, axle 62 can be turned by lever 29. Since the cam lever 29 is to be turned infrequently and at a slow speed, axle 62 is journaled directly in the casing 22, without the use of bushings, as indicated. Bosses 65 maintain the axle 62 and circular cams 60 at a proper disposition within the casing 22. The cams 60 are spaced apart between outer circular bosses 65. The eccentric axle 62 is central with respect to the bosses 65. Note that one boss 65 has a cut out portion at 66 to provide space for other parts of the mechanism. As shown best in FIG. 4, cams 60 bear against the inside of end flanges 50 of dog 50. The innermost position of cams 60 is shown in FIG. 2, with dog 50 engaged with drum 30 and worm gear 40. Turning of axle 62 by lever 29 will change the cams 60 to an outermost position, moving the dog 50 outward (to the left in FIG. 2), away from drum 30 and gear 40. The outermost position is shown at FIG. 4. With the dog 50 disengaged, drum 30 is free to rotate independently within worm gear 40. Chain 28, wound and under tension will quickly run out to release the brake. As a precautionary measure, the quick release described above, or any other type, is not recommended for use with sprocket type winding members having exposed lengths of idle chain.

A main drive shaft 70 (entirely visible in FIG. 3) has an outward extending end 71, terminating in a suitable cross-sectional shape for reception in a matching opening at the hub of hand wheel 26. The opposite end and a large diameter bearing portion 73 are journaled in the casing 22 on bushings 75. A spindle portion 78 extends from portion 73 within the casing 22, as shown.

High speed drive means are provided by a speed multiplying gear train. An initial gear 80 of the gear train is secured on spindle portion 78 for rotation therewith by a key 81. A small, speed multiplying driven gear 82 of few teeth is journaled for rotation on an idler shaft 83 and enmeshed with the initial gear 80, as shown best in FIG. 2. A large, many toothed speed multiplying drive gear 84 is also journaled for rotation on idler shaft 83. Both speed multiplying gears 82, 84 are coupled together for rotation relative to shaft 83. However, it is understood that idler shaft 83 could just as well be journaled in appropriate bushings and keyed to speed multiplying gears 82, 84 for rotation therewith, if desired. A final gear 86 is journaled on the spindle 72 and in mesh with speed multiplying drive gear 84. The final gear 86 rotates relative to spindle portion 72. As shown in FIG. 3, initial gear 80 includes a spacer lip 87 to maintain a separation from final gear 86. A retainer bushing 89 is provided on spindle portion 78 at the opposite side of final gear 86. Rotation of shaft 70, by turning hand wheel 26 in either direction, will rotate initial gear 80 and drive the speed multiplying gears 82, 84 on idler shaft 83 at higher speed in an opposite direction. In turn, gear 84 imparts even higher speed to final gear 86, and always in the same direction as rotation of spindle portion 78.

Low speed drive means are provided by a collet 90 which is mounted on spindle portion 78 of shaft 70. An axial keyway 94 is provided through the collet 90 for reception of an elongated key 96 extending radially from the spindle portion 78 (see FIG. 3). A cushion spring 98 receives a reduced diameter portion 97 of collet 90 and extends between the collet 90 and casing 22. Thus, it is easily visualized that collet 90 must rotate with spindle portion 78 by virtue of key 96 within keyway 94. Yet, limited axial movement of the collet 90 with respect to spindle 78 is also permissible within limits of cushion spring 98.

A hollow drive worm 100 slidably receives a thrust bearing 102, which in turn is journaled on spindle portion 78. Worm 100 is free to slide axially along spindle portion 78 to either of the aforementioned high or low speed drive means at final gear 86, or collet 90, respectively. The worm, when at high speed drive (to the right in FIGS. 3 and 4) is also free to rotate relative to the spindle portion 78 along with the final gear 86. The helix of worm 100 is right-handed, that is, by turning hand wheel 26 in a clockwise direction, worm 100 will drive worm gear 40, as viewed in FIG. 3, clockwise (indicated by arrow) to wind chain. Naturally, the reaction force of form gear 40 is opposite, in a direction tending to move worm 100 toward collet 90.

Coupling means, of various types to be described, are provided at opposite ends of the worm for alternative engagement with the final gear 86 (as in FIG. 4) or collet 90 (as in FIG. 3). Furthermore, connecting means 110 are provided to allow contraction of the coupling means axially into worm 100 upon initial contact with the high speed drive while in reverse rotation to unwind chain. Therefore, the end of worm 100 nearest final gear 86 has an axial bore 112 for reception of a connection sleeve 114 therein. The bore 112 and sleeve 114 have corresponding threads 115 so that high speed connection 110 may be contracted into worm 100 by screwing inward. Threads 115 are opposite in direction to the helix worm 100, that is, threads 115 are left handed. It may be visualized that initial contact of the high speed coupling 110 with final gear 86 in a chain unwinding direction will turn sleeve 114 counter-clockwise to screw axially into worm 100.

Stop means are provided by pins 120 and 125 to limit rotation of the high speed coupling 110 with respect to worm 100. As shown, pin 120 extends axially outward from the high speed end of worm 100. Pin 125 extends radially from coupling 120 at an intersecting disposition with respect to pin 120 allowing but a single turn of coupling 110 into worm 100. Naturally, other stop means are available. For example, a stop could be provided by appropriately limiting the extent of threads 115.

Yieldable means urging the worm 100 toward the high speed drive are provided in a compression spring 130 received within hollow worm 100 between thrust bearing 102 and sleeve 114. A retaining ring 135 anchors one end of spring 130 by limiting outward axial movement of bearing 102. As is apparent with reference to FIG. 3, the opposite end of spring 130 thrusts against sleeve 114 to bias worm 100 toward the high speed drive and against the reaction of worm gear 40. Thrust bearing 102 could be a simple bushing, preferably, however, is a ball bearing, to eliminate friction transmittal from spindle 78 through spring 130 to worm 100.

As may be best visualized with reference to the enlarged drawings of FIGS. 5 through 10, interlocking lugs 140, 142 may be utilized to couple high speed connection 110 to final gear 86. Lugs 140, 142 are integral extensions of high speed connection 110 and final gear 86, respectively. They interlock together over the retainer bushing 89. Each of the interlocking lugs 140, 142 includes a winding surface and an unwinding surface. The unwinding surfaces are merely flat engaging surfaces at 144. However, the winding surfaces include short, flat portions 146 and cam portions 148, as shown.

FIGS. 12 through 14 show an alternate coupling provided by engaging clutch faces. In this alternate embodiment final gear 86 and connection 110 include integral flat radial clutch faces 150, 155, respectively, provided by a suitable metal of desirable wear and friction properties.

A low speed coupling is provided between collet 90 and worm 100. The collet 90 has a flat radial face 160. In the embodiment of FIGS. 5–11, collet 90 has dents 162. Lug teeth 165, integrally formed at the low speed end of worm 100, extend axially outward for engagement within the dents 162. It is clear that full engagement of teeth 165 in dents 162, as in FIGS. 3, 7 and 8, will drive worm 100 at low speed along with collet 90 and spindle portion 78.

An alternate embodiment of a low speed coupling is shown at FIGS. 12 through 14. There facing sets of ratchet teeth 170, 172 are provided at the worm 100 and the collet 90. Engagement between the ratchet teeth 170, 172 provides drive from collet 90 to worm 100; however, whenever worm 100 is rotating faster, it merely ratchets past.

Operation of the invented hand brake may be visualized best with reference to FIGS. 5 through 11 for one coupling embodiment and 12 through 14 for the other. At FIG. 5 the interlocking lugs 140, 142 are engaged to couple worm 100 for rotation by final gear 86. Slack chain may be taken up by clockwise rotation of hand wheel 26 (FIG. 1).

The final gear 86 is roated in a direction indicated by the arrow at a much faster rate than the spindle portion 78. The flat drive surfaces 146 of the interlocking lugs 140, 142 are engaged together and the worm 100 turns at the same high rate as the final gear 86 to quickly wind slack. When the slack is completely taken up, the reaction of the worm gear 40 against the worm 100 will begin to increase, as indicated by the arrow R. The compression spring 130 urges the worm 100 against the reaction R in the direction indicated by arrow S. As the chain is wound reaction R increases and overcomes compression spring 130 to slide the worm axially away from final gear 86. As the interlocking lugs 140, 142 disengage, the cam surfaces 148 are brought into opposition. Increased reaction force R begins to slow worm 100, while final gear 86 continues to rotate at a high rate. Thus, at the position shown in FIG. 6, the interlocking lug 142 with its cam surface 148 will begin to turn with respect to the lug 140. As the cam surfaces 148 move with respect to each other, they drive the worm 100 further along toward the low speed drive at collet 90. The extra thrust by the cam surface 148 assures that the worm 100 engages collet 90. Worm 100, then, cannot remain between the high and low speed drives. At this point the worm teeth 165 engage the radial face 160 of collet 90, which yields slightly against the cushion spring 98. The worm 100 is still turning at a faster rate than collet 90. Therefore, the teeth 165 will slide along the radial surface until they engage the corresponding dents 162 for reception therein. The increasing reaction R of the worm gear 40 and the bias of cushion spring 98 insure that the teeth are fully engaged within the dents 162. At this time, shown in FIG. 7, the worm 100 is separate from the high speed drive, and fully engaged by the low speed drive thus a high mechanical advantage may be utilized to wind the chain and apply the brake.

At FIG. 8, the brake is being released, so rotation is in a counter clockwise direction indicated by the arrow. Reaction R still maintains the worm 100 at the low speed drive position, shown. The chain is unwound at low speed until the spring force S equals the reaction for R. At this point (FIG. 9), the spring force S begins to slide the worm 100 toward final gear 86. The worm 100 is turning at the same slow rate that collet 90 and spindle portion 78 are. On the other hand, final gear 86 is rotating at a very high rate of speed. It is clear that engagement between the interlocking lugs 140, 142 while the low speed coupling is still partially engaged would be extremely rough. Therefore, upon initial engagement with the final drive gear 86 in an upwinding direction, the high speed connection 110 contracts axially inward to allow complete disengagement of worm teeth 165 from dents 160. This is accomplished by turning connection 110 counter clockwise with respect to worm 100 to screw sleeve 114 axially into bore 112. Since final gear 86 is turning counter clockwise at a high rate, initial contact therewith will provide such rotation of connection 110. This has been indicated by the change in position of the pin 125 from that shown in FIG. 8 to that shown in FIG. 11. In this manner the high speed connection 110 contracts axially by screwing into the worm 100 for a smooth interchange to the high speed drive. As shown at FIG. 11, when high speed connection 110 completes a full 360 degree turn pin 125 will come to rest against the opposite side of pin 120. At this time the engagement between the interlocking lugs 140, 142 is complete. Thereupon the continued unwinding of chain may be at a high rate, since the worm 100 is driven by the high speed drive gear 86.

Operation of the alternate embodiment, that is friction clutch faces and ratchets of the high and low speed couplings, respectively, are indicated by the three positions shown by FIGS. 12 through 14. FIGURE 12 shows the high speed position with the clutch faces engaged. Friction between the clutch faces is, of course, dependent upon spring force S. In the same manner as described above, clockwise high speed rotation of final gear 86 by hand wheel 26 (FIG. 1), will rotate the worm 100 at the same high rate to quickly take up slack chain. Thereupon, reaction R increases to diminish spring force S and the friction between the clutch faces 150, 155, which will then begin to slip by one another. In this embodiment, the low speed coupling by the opposed ratchet teeth 170 is always in engagement during the winding direction. When worm 100 is in high speed drive, the ratchet teeth 170, 172 merely ratchet past one another. However, upon slippage of clutch faces 150, 152, the worm 100 will slow down, allowing the collet 90 to catch up. Thereupon, worm 100 is driven by collet 90 through engagement of ratchet teeth 170, 172. As reaction R increases clutch faces 150, 155 will separate, as at FIG. 13 to completely eliminate any frictional load therefrom to turning of the handwheel. Again reverse rotation will unwind the chain until the reaction R is equal to the spring force S. Then spring 130 will begin to slide the worm 100 toward the high speed final gear 86. On initial engagement between the clutch faces 150, 155 the high speed connection 110 will screw axially into the worm 100, as shown at FIG. 14. (Note that the low speed ratchets 170, 172 are separated by the axial contraction.) On the other hand, rotation clockwise in a winding direction will unscrew the high speed connection 110 one turn. An operational cycle is then completed back to the position shown in FIG. 12. The ratchets 170, 172 are again engaged and will pass over one another as long as worm 100 rotates faster than collet 90.

The present invention may be embodied in other specific forms without departing from the spirit of potential attributes thereof and, accordingly, reference should be made to the appended claims, rather than to the foregoing specification as indicating the scope of the invention.

I claim:
1. An automatic two-speed hand brake mechanism, comprising: a rotary chain winding member with a worm gear therefor; a drive shaft with a hand wheel for turning thereof; high and low speed drive means for rotation about an axis, tangential to said gear, in response to said turning of said shaft; a worm journaled on said axis and in engagement with said gear, said worm being slidable along said axis into engagement, alternatively, with said high and low speed drive means for rotation thereby to drive said gear and winding member; and yieldable means urging said worm against the chain winding reaction of said gear to said high speed drive means to quickly wind slack chain, said reaction thereupon increasing and overcoming said yieldable means to slide said worm to said low speed drive means for additional mechanical advantage.

2. A mechanism in accordance with claim 1, wherein said drive shaft is journaled to turn on said axis, said low speed drive means being keyed to said shaft for rotation therewith, while said high speed drive means rotates about said shaft at a speed relative thereto.

3. A mechanism in accordance with claim 2, wherein said high speed drive means includes a speed multiplying gear train having an initial gear keyed to said shaft for rotation therewith and a final gear journaled on said shaft for rotation relative thereto.

4. A mechanism in accordance with claim 3, wherein said worm is journaled for rotation on said shaft between said high and low speed drive means, said low speed drive means being at an end of said worm in the direction of said reaction.

5. A mechanism in accordance with claim 4, wherein said worm has coupling means at both ends for engagement with said high and low speed drive means.

6. A mechanism in accordance with claim 5, wherein said coupling means have connection means in said worm allowing axial contraction of said coupling means into said worm at initial contact with said high speed drive means upon reverse rotation to unwind chain, thereby providing complete disengagement from said low speed drive means before engagement with said high speed drive means for a smooth interchange therebetween.

7. A mechanism in accordance with claim 6, wherein said connection means are provided by an axial bore in said worm for reception of said coupling means, said bore and coupling means having corresponding threads of a direction screwing said coupling means into said worm at said initial contact.

8. A mechanism in accordance with claim 7, wherein said direction of said threads is opposite to that of said worm.

9. A mechanism in accordance with claim 7, wherein said connection means include stop means to limit turns of said coupling means relative to said worm.

10. A mechanism in accordance with claim 9, wherein said coupling means are a low speed coupling integrally formed at one end of said worm and a high speed coupling having said connection means at the opposite end of said worm.

11. A mechanism in accordance with claim 10, wherein said high speed coupling includes a threaded extension sleeve received by said threads within said bore, and said stop means are provided by a pair of pins projecting from said worm and high speed coupling at intercepting dispositions limiting said sleeve to a single turn relative to said worm.

12. A mechanism in accordance with claim 11, wherein said yieldable means is a compression spring coiled about said shaft within said worm, said spring acting between said sleeve and a retaining ring on said shaft.

13. A mechanism in accordance with claim 12, including a thrust bearing between said spring and ring to reduce any friction load between said shaft and worm during relative rotation therebetween.

14. A mechanism in accordance with claim 12, wherein said low speed coupling has integral teeth extending axially outward at said one end of said worm, and said low speed drive means are provided by a collet keyed on said shaft for engagement with said teeth.

15. A mechanism in accordance with claim 14, wherein said collet has an axial keying slot receiving an elongated key extending radially from said shaft, said collet slidable axially along said key, and including a cushion spring to oppose movement of said collet away from said worm yet enabling said collet to yield slightly upon contact with said low speed coupling.

16. A mechanism in accordance with claim 15, wherein said collet has a radial face with spaced dents therein oposite said teeth, said collect yielding against said cushion spring for alignment and smooth reception of said teeth in said dents upon engagement therebetween.

17. A mechanism in accordance with claim 15, wherein said collet also has teeth, all said teeth of said worm and collet of matching ratchet shape for drive in a chain winding direction, said collect yielding against said cushion spring and allowing said worm to rotate faster in a chain winding direction with said teeth ratcheting over one another upon engagement with said high speed drive means.

18. A mechanism in accordance with claim 15, wherein said high speed coupling has spaced lugs integral with said sleeve and projecting outward therefrom, and said final gear of said high speed drive means has integral opposed lugs for interlocking engagement therewith.

19. A mechanism in accordance with claim 15, wherein said high speed coupling has a radial clutch face at an outer end of said sleeve, and said final gear of said high speed drive means has an opposed clutch face for frictional engagement therewith.

20. A mechanism in accordance with claim 15, wherein said collet has a radial clutch face at an outer end of said sleeve, and said final gear of said high speed drive means has an opposed clutch face for frictional engegement therewith, and wherein said collet also has teeth, all said teeth of said worm and collet of matching ratchet shape for drive in a chain winding direction, said collet yielding against said cushion spring and allowing said worm to rotate faster with said teeth ratcheting past one another during rotation in a chain winding direction by said frictional engagement.

21. A mechanism in accordance with claim 15, wherein said high speed coupling has spaced lugs integral with said sleeve and projecting axially outward therefrom, and said final gear of said high speed drive means has opposed lugs for inter-locking engagement therewith, and wherein said collet has a radial face with spaced dents therein opposite said teeth, said collet yielding against said cushion spring for alignment and smooth reception of said teeth in said dents upon engagement therebetween.

22. A mechanism in accordance with claim 21, wherein said spaced and opposed lugs have winding and unwinding surfaces for contact during engagement therebetween, said winding surfaces providing an innermost flat portion for positive drive contact therebetween and an outermost cam portion for imparting an axial thrust to said worm along with said reaction toward said collet for a smooth transition thereto by entry of said teeth into said dents.

23. A mechansim in accordance with claim 22, wherein said chain winding member and worm gear are keyed together by a dog means axially slidable out of engagement therewith for release of said member from said worm gear, and including a cam means operated by a lever to slide said dog means out of engagement for a quick release of chain wound on said member.

References Cited

UNITED STATES PATENTS

| | | | |
|---|---|---|---|
| 703,614 | 7/1902 | Rock | 74—505 X |
| 1,505,350 | 8/1924 | Johnson et al. | 74—508 |
| 2,639,627 | 5/1953 | Olander | 74—505 |
| 2,757,770 | 8/1956 | Robertson | 74—505 X |

FRED C. MATTERN, Jr, *Primary Examiner.*

LEONARD H. GERIN, *Assistant Examiner.*